United States Patent
Shahriar et al.

(10) Patent No.: US 12,355,781 B2
(45) Date of Patent: Jul. 8, 2025

(54) METHOD OF AUTHENTICATING A CALLER

(71) Applicant: Comcast Cable Communications, LLC, Philadelphia, PA (US)

(72) Inventors: Muneem Shahriar, Sunnyvale, CA (US); Arpit Mathur, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 259 days.

(21) Appl. No.: 17/711,288

(22) Filed: Apr. 1, 2022

(65) Prior Publication Data
US 2023/0319058 A1     Oct. 5, 2023

(51) Int. Cl.
| | |
|---|---|
| G06F 15/16 | (2006.01) |
| G06F 9/54 | (2006.01) |
| G06Q 20/38 | (2012.01) |
| H04L 9/40 | (2022.01) |
| H04L 29/06 | (2006.01) |
| H04L 65/1076 | (2022.01) |
| H04L 65/1089 | (2022.01) |

(52) U.S. Cl.
CPC ....... *H04L 63/126* (2013.01); *G06Q 20/3821* (2013.01); *H04L 65/1076* (2013.01); *H04L 65/1089* (2013.01)

(58) Field of Classification Search
CPC .............. H04L 63/126; H04L 65/1069; G06Q 20/3821; H04M 1/575; H04M 1/80; H04M 3/228

USPC ........................................................... 706/4
See application file for complete search history.

(56) References Cited

U.S. PATENT DOCUMENTS

| | | | |
|---|---|---|---|
| 8,504,702 B2 * | 8/2013 | Diehl .................. | H04L 61/4505 709/228 |
| 10,522,138 B1 * | 12/2019 | Sambarino .......... | H04M 3/5175 |
| 10,778,839 B1 * | 9/2020 | Newstadt ............. | H04M 1/663 |
| 2003/0108161 A1 * | 6/2003 | Brown .................. | H04M 3/436 379/88.01 |
| 2008/0249951 A1 * | 10/2008 | Gilder ................ | G06Q 20/0425 705/76 |
| 2013/0266127 A1 * | 10/2013 | Schachter .............. | G10L 25/48 379/88.01 |
| 2015/0039470 A1 * | 2/2015 | Crites ................. | G06Q 20/3821 705/26.61 |
| 2015/0089568 A1 * | 3/2015 | Sprague .............. | H04L 63/0838 726/1 |
| 2015/0121063 A1 * | 4/2015 | Maller ................ | H04L 63/0435 713/153 |
| 2017/0270569 A1 * | 9/2017 | Altberg .............. | G06Q 30/0276 |
| 2018/0020009 A1 * | 1/2018 | Wei ....................... | G06Q 20/227 |
| 2018/0137512 A1 * | 5/2018 | Georgiadis ............. | H04L 63/08 |
| 2018/0337918 A1 * | 11/2018 | Chang .................... | H04L 63/108 |
| 2019/0164539 A1 * | 5/2019 | Schmidt ................ | G06F 40/284 |
| 2020/0092285 A1 * | 3/2020 | Graham ................ | H04L 63/18 |
| 2020/0097971 A1 * | 3/2020 | Church .................. | G06Q 20/36 |

(Continued)

*Primary Examiner* — Hamza N Algibhah
(74) *Attorney, Agent, or Firm* — BakerHostetler

(57) ABSTRACT

Methods and systems are described for authenticating one or more parties to a communication. An example method may comprise pausing or otherwise interrupting a call based on determining the call includes a request for sensitive information from a party to the call. An identity of the party to the call may be verified and the call may be resumed based on the verification of the identity of the party to the call.

28 Claims, 7 Drawing Sheets

(56) References Cited

U.S. PATENT DOCUMENTS

| | | | |
|---|---|---|---|
| 2020/0137050 A1* | 4/2020 | Reddimasi | H04W 12/12 |
| 2020/0236547 A1* | 7/2020 | Flanagan | G06Q 20/3821 |
| 2020/0304546 A1* | 9/2020 | Chavez | H04L 65/1076 |
| 2021/0092227 A1* | 3/2021 | Naujok | H04M 3/42034 |
| 2021/0144246 A1* | 5/2021 | Murphy | H03M 3/436 |
| 2021/0264018 A1* | 8/2021 | Helles | G06F 21/45 |
| 2021/0312026 A1* | 10/2021 | Rose | G06Q 20/065 |
| 2021/0328982 A1* | 10/2021 | Praszczalek | H04L 9/3231 |
| 2022/0006898 A1* | 1/2022 | Soryal | H04M 1/575 |
| 2022/0076262 A1* | 3/2022 | Boyd | G06Q 20/38215 |
| 2022/0094790 A1* | 3/2022 | Knuth | H04M 3/5141 |
| 2022/0245628 A1* | 8/2022 | Alfeche | G06Q 20/40145 |
| 2022/0345371 A1* | 10/2022 | Blakey | H04L 41/12 |
| 2023/0289700 A1* | 9/2023 | Hodges | G06Q 10/06398 |

\* cited by examiner

METHOD OF AUTHENTICATING A CALLER

BACKGROUND

Unwanted solicitation and/or scam calls are a problem. Moreover, a rise of deep-fake videos (e.g., fake videos of people generated by artificial intelligence) has enabled dangerous capabilities if used in communication media such as video-chat. For example, as quality of deep fakes improves, it will be harder to distinguish between an actual person and a computer-generated replica. Current solutions are limited in the ability to authenticate legitimacy of callers. Thus, improved techniques for authenticating a caller are needed.

SUMMARY

Methods and systems are disclosed for authenticating one or more parties to a communication (e.g., a phone call or video-chat). A network device may receive an incoming communication. The incoming communication may be identified as having an unknown source or may be analyzed to identify a request for sensitive information. For example, audio from an incoming phone call or video-chat may be analyzed using one or more of voice-to-text conversion, keyword searching, and/or machine learning based processing. If a request for sensitive information is detected or a communication is identified as having an unknown source, a security escalation process may begin. A status of the communication or a source of the communication may be output (e.g., via a display) to the recipient of the communication. The status may indicate that the communication is unsecure or the source of the communication is unverified. Moreover, the communication may be paused and/or outgoing communication (e.g., audio or video) may be blocked so a user does not accidentally share sensitive information on an unsecured communication.

An identity of one or more parties to a communication (e.g., a source of the communication or a party requesting sensitive information) may be verified based on one or more forms of authentication. For example, a party requesting sensitive information may be authenticated via biometric authentication or audio/video confirmation from a trusted device. A gateway device (e.g., configured as a trusted device) located at a premises of the party to authenticate may receive a request to authenticate the party requesting the sensitive information. The gateway device may perform the authentication based on one or more monitored parameters (e.g., audio or video confirmation, pings from assigned devices on the gateway, television viewing habits for the caller, unlocked home security with assigned code, sounds produced in the caller's home environment, etc.) or data received from one or more trusted devices connected to the gateway device.

If the party becomes verified, a verified status may be outputted (e.g., based on receiving a signed verification token). A paused communication may be resumed once the identity of the party requesting the sensitive information has been verified. A network device facilitating the communication may be configured to allow exchange of a signed token based on verifying the identity of one or more parties to the call. The signed token may be used to provide a secure call and/or as a basis for a blockchain-based payment.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
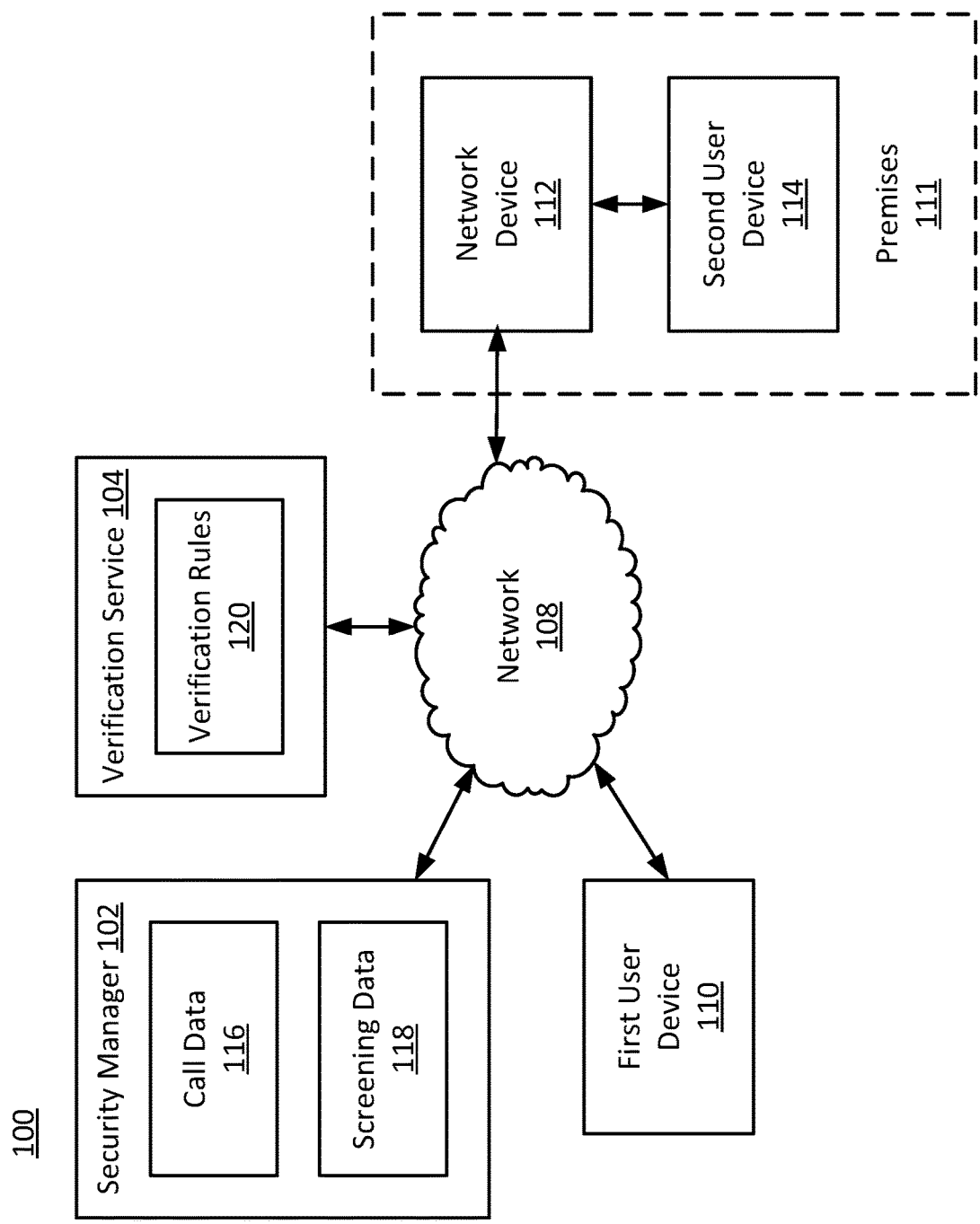
FIG. 1 shows a block diagram illustrating an example environment.

There is a lack of capabilities for communication service providers to warn customers in the context of receiving inbound communication from a potential scammer, particularly in a scenario in which a source of the communication (e.g., a caller in an audio call or voice-chat) requests sensitive information. The rise of fake videos of people generated by artificial intelligence (e.g., deep-fake videos) has enabled very dangerous capabilities when used in communication media (e.g., video-chat). For example, a user may receive a video call from an unverified number, view a video of a friend or family member in the video call, and assume the call is a legitimate call. These fake videos may be used to scam the user for money or sensitive information. The issue may be manifested in video and/or audio and, as the quality of deep fakes improves, it may become harder to distinguish between an actual person and a computer-generated replica.

Disclosed herein are methods and systems for authenticating a caller based on captured biometrics. For example, the disclosed methods and systems may be used to monitor an established communication session (e.g., phone conversation) and, if a request of sensitive information is detected, a security escalation process may begin. The communication session may be interrupted (e.g., outgoing voice may be blocked, paused, and/or the call may be forwarded to a server temporarily) so that a party to the communication session (e.g., a recipient of a call or video-chat) does not accidentally share sensitive information on an unsecured communication session. One or more parties to the communication session (e.g., the requestor of the sensitive information) may be asked or required to authenticate themselves. If the one or more parties have been verified, a signed token may be sent to the other parties of the call (e.g., inband in the metadata of the call) and the communication session may be resumed.

In an example, if a caller places a phone call or initiates a video-chat, the caller's biometric information (e.g., fingerprint, retina scan, etc.) may be used to generate an encrypted token. The token may be stored (e.g., in a cache, on a user's device, on a server, on a network device, etc.) for a duration of the call. If a security escalation process is triggered during the phone call (e.g., based on a request for sensitive information detected by a service provider), the service provider may send a request to the device to verify the caller. The device may then pass the signed token via an inband channel as metadata to the service provider. Once the caller is verified, the service provider may notify the user that the caller is indeed who they are purported to be. After the call ends, the cache may be cleared and the token may be deleted.

In an example, Joe may receive a call from someone who sounds like Susan, his wife. Susan may ask for Joe's social security number for paperwork she is completing. The request for sensitive information (e.g., social security number) may trigger the escalation process. The service provider may then send a request to Susan's phone to authenticate Susan. Once the verification is made, Joe may receive a notification that the caller is indeed Susan.

Tokens may be used to verify an authentication. For example, a token may be signed by an authority (e.g., phone manufacturer, application, or even the other person) with the authority's private key. Public keys of these authorities may be available (e.g., to the other device) to validate that the data was signed by the appropriate authority (e.g., similar to HTTPS).

Thus, the disclosed methods and systems may provide, among other improvements, a solution to the previously unsolved problem of passing biometric information inband via metadata of a voice call, allowing the use of captured biometrics to verify a user and transmit that information inband in the metadata of the call.

Further disclosed herein are methods and systems for authenticating a caller based on data captured from a gateway device (e.g., configured as a trusted device) located at a premises of the party. For example, if a security escalation is triggered during a communication session (e.g., a phone call or a video chat), a service provider may send a request to the gateway device to authenticate the caller (e.g., the source of the communication). The gateway may survey the caller's activities and send a signed token to the service provider. Once the token is received, the service provider may send a notification to the user verifying that the caller is who they say they are.

The gateway may monitor various criteria to identify the caller. If the criteria surpass a specific threshold and/or satisfy any other authentication rule the system may authenticate the caller and create a signed token. Any number of parameters may be monitored, including pings from assigned devices on the gateway (e.g., cell phone, personal computer, work computer, etc.), television viewing habits for the caller, an unlocked home security with assigned code or other interaction with a home security system, and/or sounds produced in the caller's home environment (pet noises, crying babies, etc.).

The signed token may be sent to the service provider (e.g., by ultrasound/DTMF or other technologies) inband as metadata on the established voice call. The token issuer may be paid via a blockchain-based payment system. The receiver may be notified that the call is secure via a custom sound that plays before the ringtone, a customized haptic vibration, or via a different channel (e.g., a notification on the device, a television, the gateway, or a device connected to the gateway).

For example, Susan may receive a call from someone who sounds like her husband Joe. Joe may ask Susan for her credit card number to make a purchase. This request for sensitive information (e.g., credit card number) may trigger the escalation process. The service provider may then send a request to Joe's gateway device to authenticate him. The gateway may verify that Joe is using his home computer, his cell phone is within the home, and he has been actively watching TV for the past hour. Based on the verification of Joe's activities, the gateway may send a signed token authenticating Joe and the service provider may notify Susan that the caller is indeed Joe. If the gateway cannot verify that Joe is the caller, the call may be terminated or Susan may be presented with a warning that the caller cannot be verified.

Thus, the disclosed methods and systems may provide, among other improvements, a solution to authenticating a caller. Also disclosed is a solution for sending a signed token to the service provider if an escalation is triggered.

Some disclosed methods and systems may prevent deepfake-based scams by adding a "verified by" capability to the communication session (e.g., a voice call or video chat). The verification may be based on video (e.g., or audio) recorded by a trusted video camera. An object recognition process (e.g., using a machine learning model trained to recognize specific users) may analyze the video (e.g., or audio) to determine that a person is detected and/or the person matches a specific person, such as the person for which verification is attempted.

Alice, a friend of Bob, may start a video call with Bob from a number Bob does not recognize. Bob's phone may overlay a graphic or text on the video to notify Bob that the video call is an untrusted call. The call's capabilities may be restricted based on the untrusted nature of the call. For example, Bob's phone may block Bob from responding to requests for sensitive information (e.g., social security numbers or bank information) or may distort QR codes that Alice shares with Bob for payments.

To elevate her call to verified status, Alice may request another camera in the vicinity to verify her. The video call software may present her with a list of validators near her who may verify her video. These validators may be video cameras that are managed by services (e.g., service providers or equipment manufacturers) who are unlikely to be hacked or otherwise compromised. Alice may select a local camera as the validator and she may then be required to continue the call while standing in front of the validator. Alice may add that camera to her call as the validator and the validator may then compare the video being shared on the call from Alice's phone to what the validator sees. If the videos match, the validator may send an encrypted/signed certificate with the call verifying that the video Alice is sharing is the video the validator is seeing as well. Bob's phone may validate this certificate and mark the call as verified. Though a video camera is used as an example, other devices may be used, such as a face scanner, a fingerprint scanner, an audio fingerprinting device, an authentication device (e.g., device that may send authentication information wirelessly, such as via NFC, or via a wired connection)

FIG. 1 shows a block diagram of an example system 100 for communication. The system 100 may comprise a security manager 102, a verification service 104, a network 108, a first user device 110, a network device 112, a second user device 114, or a combination thereof. While the singular term device is used herein, it is contemplated that some devices may be implemented as a single device or a plurality of devices (e.g., via load balancing). Additionally, any service may be implemented on one or more computing devices. The security manager 102, the verification service 104, the screening service 106, the network 108, the first user device 110, the network device 112, the second user device 114 may each be implemented as one or more computing devices. Any device disclosed herein may be implemented using one or more computing nodes, such as virtual machines, executed on a single device and/or multiple devices.

The security manager 102, the verification service 104, the first user device 110, the network device 112, the second user device 114 may be communicatively coupled via one or more networks, such as network 108. The network 108 may comprise a public and/or private network. The network 108 may facilitate communication via one or more communication protocols. The communication may comprise any media, such as video, audio, text, a combination thereof, and/or the like. The network 108 may comprise fiber, cable, a combination thereof. The network 108 may comprise wired links, wireless links, a combination thereof, and/or the like. The network 108 may comprise routers, switches, nodes, gateways, servers, modems, and/or the like.

The first user device 110 and/or second user device 114 may comprise a user device, such as a landline telephone, a smart phone, a desktop, a laptop, a portable computing device, a mobile computing device, a stationary computing device, a wearable computing device, etc. The first user device 110 or second user device 114 may each comprise and/or be associated with a user identifier. The user identifier may comprise a number, such as a phone number. The user identifier may comprise an address, such as a media access control address (MAC address) and/or an Internet Protocol address (IP address). The first user device 110 or second user device 114 may be associated with an entity, such as a subscriber to a service.

In some scenarios, the first user device 110 or second user device 114 may, or may not, be associated with a scam to solicit sensitive information (e.g., from a user of the second device 114). For example, the second user device 114 may initiate a communication session with the first user device 110 (e.g., and a plurality of additional user devices) and may request sensitive information from the first user device 110. For example, the second user device 114 may employ deep-fake technology to trick the first user device 110 or a user of the first user device 110 into believing a request for sensitive information is being made by a friend, family member, or trusted person or organization.

A goal of the second user device 114 may be to lure the user of the first user device 110 into disclosing or transmitting sensitive information to the second user device 114. Based on a request from the second user device 114, the user of the first user device 110 may verbally disclose sensitive information (e.g., a social security number, bank account information, credit card information, user accounts and/or passwords, etc.) or may complete a financial transaction. The appearance and/or sound transmitted by the second user device 114 may have one or more characteristics intended to manipulate or deceive a user of the first user device 110. For example, deep-fake technology may be utilized by the second user device 114 to present a counterfeit request to the first user device 110 for sensitive information.

The network device 112 may be configured to process (e.g., route) communication for a plurality of devices, including calls to and from the first user device 110 or second user device 114. The network device 112 may store call information. The call information may be accessed and/or stored as call data 116. The call data 116 may include one or more characteristics associated with the call, including a phone number, date/time, contact information, audio, video, etc. In order to protect privacy, any identifying data (e.g., call data 116) may be stored in a secure manner. The network device 112 may be configured to route communication based on the security manager 102 or the verification service 104.

The security manager 102 may be configured to analyze the call data 116. For example, the security manager 102 may identify a call as having an unknown source, suspicious, or potentially fraudulent (e.g., by comparing call data 116 to screening data 118). Moreover, the security manager 102 may be configured to generate and/or update screening data 118 based on analysis of the call data 116. The analysis may comprise any combination of techniques shown in FIGS. 3-6 and the accompanying paragraphs and/or any technique for determining screening data elsewhere described herein. The screening data 118 may comprise a list and/or a database of data used for determining whether a call should be further processed using by the security manager 102.

The screening data 118 may include text, video, images, patterns, or any characteristics that may be indicative of requests for confidential information. For example, the screening data 118 may include phrases associated with confidential information, such as "social security number," "credit card number," "bank account," "PIN number," etc.

The security manager 102 may use voice-to-text conversion to generate the call data 116. The security manager 102 may use keyword searching, or machine learning to analyze the call data 116 and determine a call (e.g., from the first user device 110) includes a request for sensitive information. The security manager 102 may determine, based on the call data 116, that a communication is insecure, has an unknown source, includes suspicious activity, or is potentially fraudulent. The security manager 102 may utilize one or more trust rules to associate a status of one or more parties to the communication with corresponding actions. For example, the one or more trust rules may comprise requiring a signed token prior to allowing a financial transaction between the parties to the communication.

To prevent a party to an unsecured communication from providing sensitive information, the security manager 102 may interrupt (e.g., pause, terminate, forward, temporarily block) a communication. Moreover, to prevent a party to the call from providing sensitive information, the security manager 102 may employ specific routing conditions set by a service entity. The security manager 102 may cause, based on determining (e.g., during a communication session) a request for sensitive information, a status to be outputted on the first user device 110. For example, the first user device 110 may output (e.g., via a display) an indication of a pending verification (e.g., from verification service 104).

The verification service 104 may comprise a plurality of verification rules 120. The network device 112 may use the verification service 104 for verification decisions and/or receive the verification rules 120 from the verification service 104 and perform verification decisions. One or more of the plurality of verification rules 120 may associate a triggering condition or process flow based on one or more inputs from the to prevent a party to the call from providing sensitive information.

The plurality of verification rules 120 may be associated with corresponding network entities. A network entity may have a set of verification rules that are specific and/or customized for the network entity. The network entity may input the set of verification rules 120. A network entity may comprise a network provider, service provider, organization, and/or the like. The verification rules 120 may be used for verifying calls for the network entity. Any communication received from the network entity (e.g., from a user of the network entity) and/or directed to the network entity (e.g., to a user of the network entity) may be processed using the verification rules 120 associated with the network entity.

The verification service 104 may be configured to verify an identity of one or more parties to the communication session. For example, the security manager 102 may send a request to the verification service 104 to verify the identity of an unknown source of a communication session (e.g., from a second user device 112). The verification service 104 may verify the identity of one or more parties to the communication session by using biometric authentication (e.g., fingerprint reading, facial recognition, eye scanning, etc.). In an example, the verification service 104 may verify an identity of a party to the communication session based on audio or video confirmation from one or more trusted devices. For example, the verification service 104 may compare audio received by the trusted device to audio associated with the call data 116. Moreover, the network entity may provide a list of users and/or other filtering criteria that may be used for verification of parties to a communication session (e.g., associated with the network entity).

The verification service 104 may send a request to network device 112 (e.g. a gateway device) to authenticate the second user device 114. The network device 112 and the second user device 114 may be located at a premises 111. The network device 112 may authenticate the second user device 114, for example, based on pings from assigned devices on the gateway, television viewing habits for the caller, unlocking a home security system with an assigned code, sounds produced in the caller's home environment, application data usage patterns, contact lists of the second user device 114, etc. As another example, the network device 112 may comprise one or more devices associated with a gateway device, such as a trusted video device (e.g., a camera) or a trusted audio device (e.g., a voice recorder). The trusted video device or the trusted audio device may use video or audio data to authenticate the second user device 114.

The verification service 104 may transmit a verification status (e.g., known, unknown, secure, insecure, verified, unverified, etc.) and/or a signed token to the security manager 102. For example, the security manager 102 may have interrupted or paused the call based on determining that a party (e.g., first user device 110) to a video-chat has requested sensitive information from another party (e.g., second user device 114) to the video-chat. The verification service 104 may verify the identity of the party to the video-chat (e.g., first user device 110) and may transmit the verification or a signed token to the security manager 102. The verification service 104 may contact the security manager 102 in any number of ways (e.g., text, etc.) For example, the signed token may be sent to a service provider (e.g., by ultrasound/DTMF or other technologies) inband as metadata on the established voice call. Based on the verification status or receipt of the signed token, the security manager 102 may unpause, allow the communication to resume, and/or reinstate the communication. In an example, if the party requested transfer of payment using blockchain, then the signed token received from the verification service 104 may be used to submit a blockchain payment.

The network device 112 may be configured to process at least a portion of the calls by sending the calls to the security manager 102. The verification rules 120 may indicate that the security manager 102 should be used to process a communication. As an example, an address, domain, and/or other destination information may be determined from the communication. This information may be used to determine the network entity associated with routing the communication (e.g., to the next hop). If routing rules are associated with the network entity, then the routing rules may be processed to determine whether to use the security manager 102. Network entities with a higher trust level may be processed (e.g., as indicated by the associated routing rule) without using the security manager 102. Network entities with a lower trust level may be processed (e.g., as indicated by the associated routing rule) by the security manager 102. An example routing rule may specify that the associated network entity and the corresponding routing action related to the security manager 102.

The security manager 102 may analyze a call by comparing data associated with a communication (e.g., call data 116) to the screening data 118. One or more identifiers in the communication may be determined, such as an identifier associated with the calling user and an identifier associated with the called user. If an identifier associated with the calling user and/or an identifier associated with the called user matches the screening data 118, then the call (e.g., the message) may be sent to the security manager 102. The security manager 102 may use other rules and/or criteria to determine a party to a communication is untrusted. Example criteria may comprise a source number being included in a suspect call list, comparison (e.g., to a threshold) of occurrence of calls from a source number, date/day/time of a call, a request for sensitive information, etc.

Figure 2:
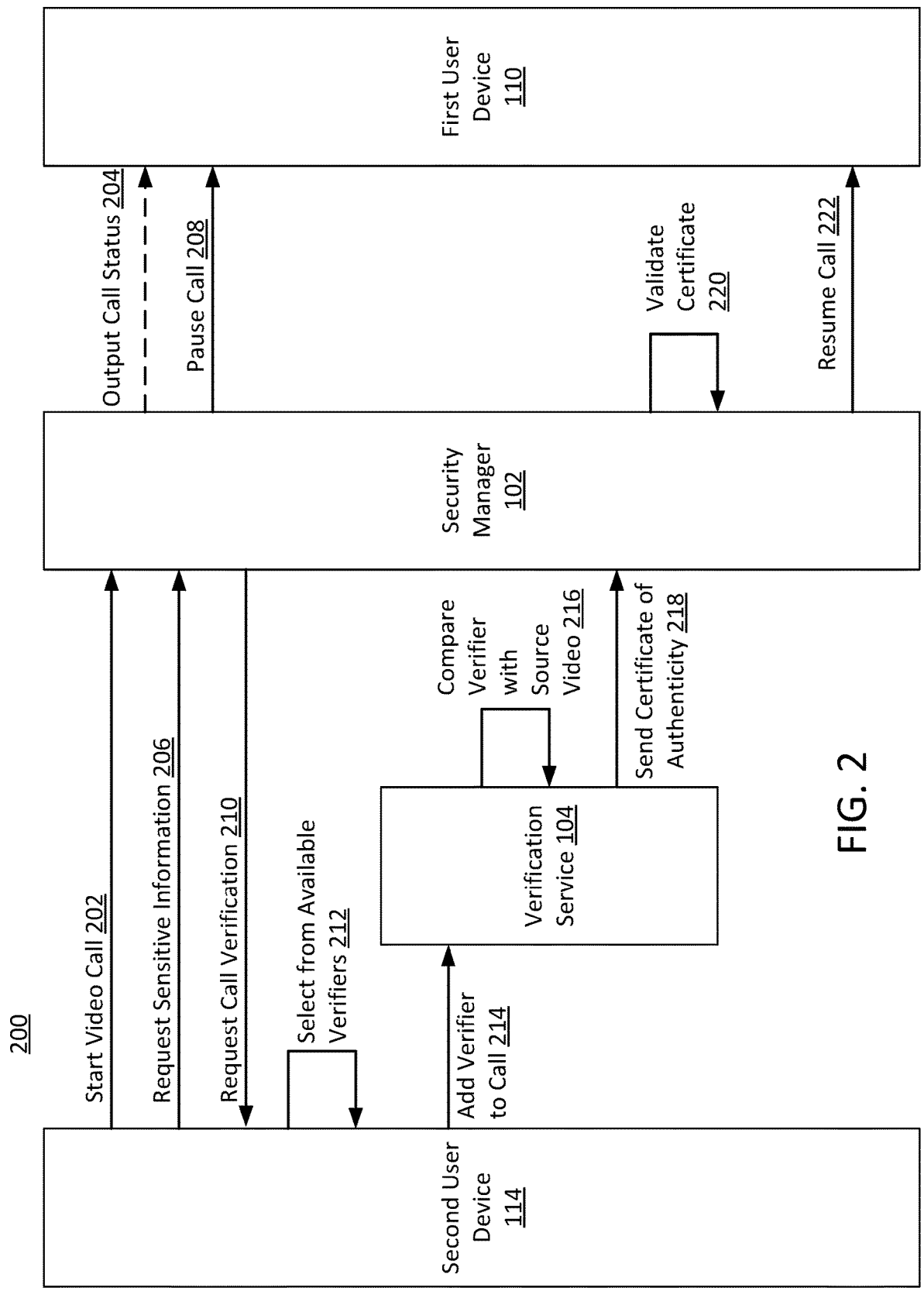
FIG. 2 shows a process diagram illustrating an example communication flow.

FIG. 2 is a process diagram that shows a process 200 for authenticating a party to a communication. The process may include one or more of the devices of FIG. 1, including the first user device 110, the security manager 102, the verification service 104, the network device 112, and the second user device 114. The process 200 may prevent deep-fake-based scams by adding a "verified by" capability to the voice call, e.g., where the verification is based on video recorded by a trusted video camera (e.g., network device 112).

As illustrated in FIG. 2, at step 202 of the process 200, the second user device 114 may initiate a call 202 (e.g., a video call) with the first user device 110. At step 204, the process 200 may output a call status (e.g., secure, unsecure, etc.). For example, the process 200 may indicate to a user of the first user device 110 that the call is unsecure, e.g., by overlaying video from the video call with an unsecure label. The unsecure label may serve as a warning to a user of the first user device 110. Moreover, the security manager 102 may store and/or analyze call data (a phone number, date/time, contact information, audio, video, etc.). In some examples, the security manager 102 may be a part of the first user device 110. For example, the security manager 102 may be included in a software application running on the first user device 110.

At step 206 of the process 200, the second user device 114 may request sensitive information (e.g., a social security number, bank account information, credit card information, user accounts and/or passwords, etc.) from the first user device 110. The security manager 102 may store or access screening data including text, video, images, patterns, or any characteristics that may be indicative of requests for confidential information. The security manager 102 may identify the request for sensitive information by comparing the call data with the screening data.

In order to prevent an unsecured transfer of confidential information, at step 208, the process 200 may pause (e.g., or otherwise interrupt) the call based on the request for sensitive information. At step 210 of process 200, the first user may request call verification from the security manager 102 and/or the security manager 102 may initiate call verification with the second user device 114. For example, the security manager 102 may pause the call for both sides (e.g., caller and callee) at the same time. The security manager 102 may then ask the caller to verify within a short period of time and inform the callee that the call is on hold because the caller is being verified.

At step 212 of process 200, the second user device 114 may select a verifier from a list of available verifiers. A verifier may be a trusted device such as another device (e.g., network device 112) connected to the same network (e.g., network 108) and/or another device in the vicinity of the first user device 110. The verifier may be configured to record audio, video, or may comprise another device configured to receive a user input.

At step 216, verification service 104 may compare input from the verifier (e.g., network device 112) with data associated with the call (e.g., source video). For example, the verification service 104 may compare audio or video from the verifier with audio or video from the call. In another example, the verifier may be a home security gateway and the verifier may request a user of the second user device 114 to input a code (e.g., an unlock code) into an input device associated with the security gateway. At step 218, the verification service 104 may send a certificate of authenticity to the security manager 102 and, at step 220, the security manager 102 may validate the certificate 220.

At step 222, the call may be resumed. For example, the second user device 114 may continue the call and a graphic may be overlayed notifying a user of the second user device 114 that the call is secure.

In an example use case, Alice, a friend of Bob, may start a video call with Bob from a number Bob does not recognize (e.g., step 202). Bob's phone may overlay a graphic or text on the video to notify Bob that the video call is an untrusted call (e.g., step 204). The call's capabilities may be restricted based on the untrusted nature of the call. Bob's phone may block certain responses for sensitive information (e.g., step 206) and/or may pause the call based on a request for sensitive information (e.g., step 208).

To elevate her call to verified status, Alice may request another camera in the vicinity to verify her. The video call software may present her with a list of validators near her who may verify her video. These validators may be video cameras that are managed by services (e.g., service providers or equipment manufacturers) that are unlikely to be hacked or otherwise compromised. Alice may select a local camera as the validator (e.g., step 212) and she may then be required to continue the call while standing in front of the validator. Alice may add that camera to her call as the validator (e.g., step 214) and the validator may then compare the video being shared on the call from Alice's phone to what the validator sees (e.g., step 216). If the videos match, the validator may send an encrypted/signed certificate with the call verifying that the video Alice is sharing is the video the validator is seeing as well (e.g., step 218). Bob's phone can validate this certificate (e.g., step 220) and mark the call as verified (e.g., step 222). If Alice does not attempt to elevate her call to verified status or a validator cannot verify Alice as the caller, the call may be terminated or Bob may be presented with a warning that the caller cannot be verified, e.g., based on Bob's phone being unable to validate a certificate (e.g., step 220).

Figure 3:
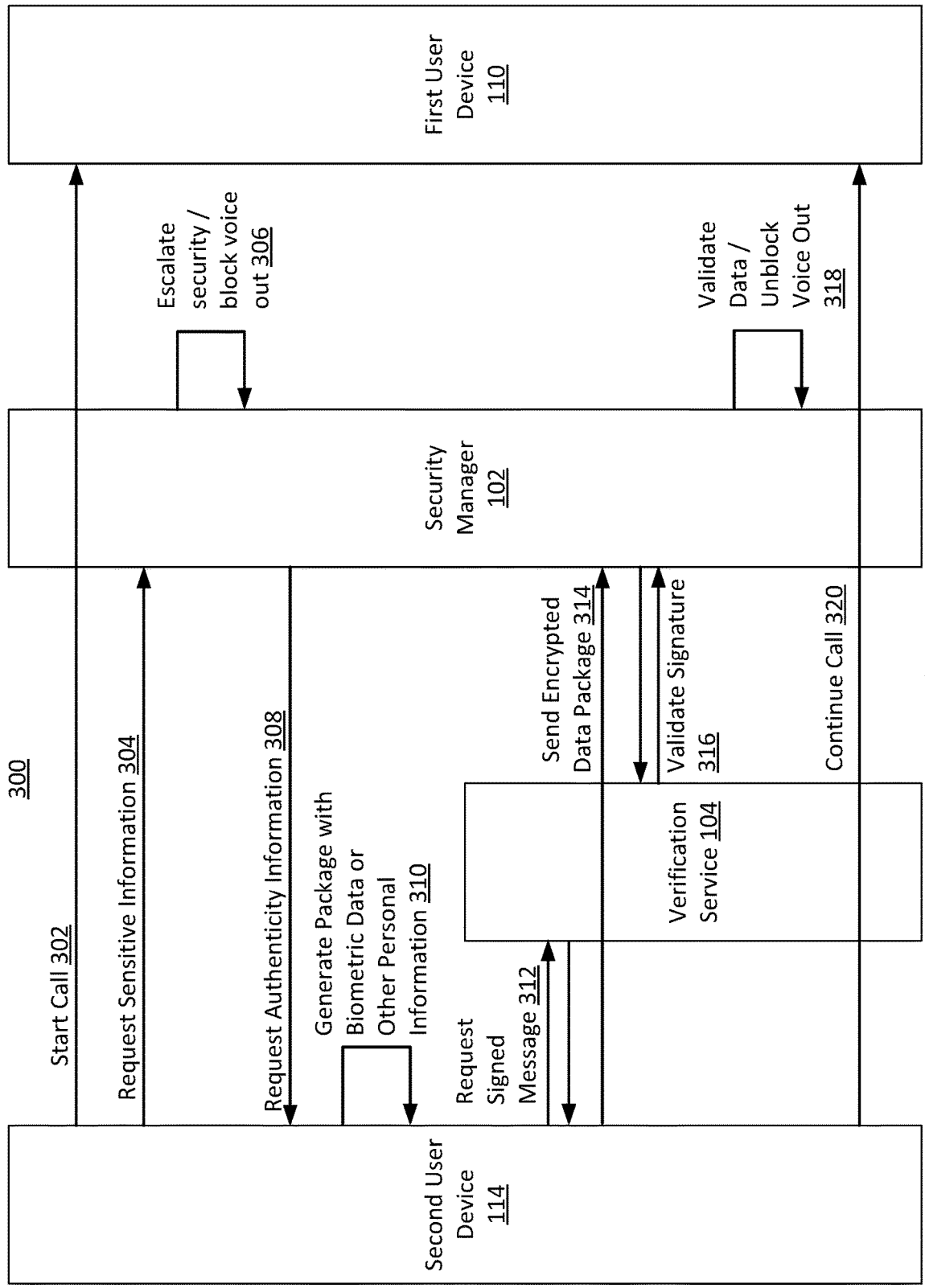
FIG. 3 shows a process diagram illustrating an example communication flow.

FIG. 3 is a process diagram that shows a process 300 for authenticating a caller. The process may include one or more of the devices of FIG. 1, including the first user device 110, the security manager 102, the verification service 104, and the second user device 114. The process 300 may prevent deep-fake-based scams by interrupting a call if a request for sensitive information is detected and continuing the call (e.g., as an encrypted call) based on verification of the requestor.

If a caller places a phone call, his or her biometric information (e.g., fingerprint, retina scan, etc.) may be used to generate an encrypted token. The token may be stored in the cache for the duration of the call. If the security escalation process is triggered during the phone call, the service provider may send a request to the device to verify the caller. The device may then pass the signed token via the inband channel as metadata to the service provider. Once the caller is verified the service provider may notify the user that the caller is who they say they are. After the call ends, the cache may be cleared and the token may be deleted.

As illustrated in FIG. 3, at step 302 of the process 300, the second user device 114 may start a call (e.g., a video call) with the first user device 110. At step 304 of the process 300, the second user device 114 may request sensitive information (e.g., a social security number, bank account information, credit card information, user accounts and/or passwords, etc.) from the first user device 110. The security manager 102 may store or access screening data including text, video, images, patterns, or any characteristics that may be indicative of requests for confidential information. The security manager 102 may identify the request for sensitive information by comparing the call data with the screening data.

In order to prevent an unsecured transfer of confidential information, at step 306, the security manager 102 may escalate security based on the request for sensitive information and/or block voice or video transfer between the first user device 110 and the second user device 114. The security manager 102 may pause the call based on the request for sensitive information. For example, security manager 102 may monitor an established phone conversation (e.g., step 302) and, if a request of sensitive information is detected (e.g., step 304), a security escalation process may begin (e.g., step 306). The security manager 102 may then block the outgoing voice so that the user does not accidentally share sensitive information on an unsecured call (e.g., step 306).

At step 308 of process 300, the security manager 102 may request authenticity information from the second user device 114. For example, the security manager 102 may ask the caller to authenticate themselves.

At step 310, the second user device 114 may generate a package with biometric data or other personal information. For example, the second user device 114 may receive one or more inputs from a user (e.g., fingerprint, facial scan, retina scan, password, security key, etc.) and may incorporate the one or more inputs into the package or use the one or more inputs to generate the package.

At step 312, the verification service 104 may request a signed message from the second user device 114. For example, the verification service 104 may request a signed token from the second user device 114 and the token may be signed by an authority (e.g., phone manufacturer, application, user, etc.) with a private key.

At step 314, the second user device 114 may send an encrypted data package 314 to the security manager 102. At step 316, the security manager 102 may send a validated signature to the verification service 104. At step 318, the security manager 102 may validate the data and/or unblock the voice out established at step 306. For example, a corresponding public key of the authority may be available to the first user device 110 and may be used to validate that the data was signed by the appropriate authority (e.g., similar to HTTPS).

At step 320, the second user device 114 may continue the call with the first user device 110. For example, once the caller has been verified (e.g., step 318), a signed token may be passed to the second party inband in the metadata of the call, and the outgoing voice may be unblocked.

In an example use case, Joe may receive a call from someone who sounds like Susan, his wife (e.g., step 302). Susan may ask for Joe's social security number for paperwork she is completing (e.g., step 304). The request for sensitive information (e.g., social security number) may trigger the escalation process. The service provider may then send a request to Susan's phone to authenticate Susan (e.g., step 308). Once the verification is made, Joe may receive a notification that the caller is indeed Susan (e.g., step 320).

The token may be signed by an authority (e.g., phone manufacturer, application, or even the other person) with the authority's private key (e.g., step 312 and step 314). Public keys of these authorities may be available to the other device that can validate that the data was signed by the appropriate authority (e.g., step 318).

Figure 4:
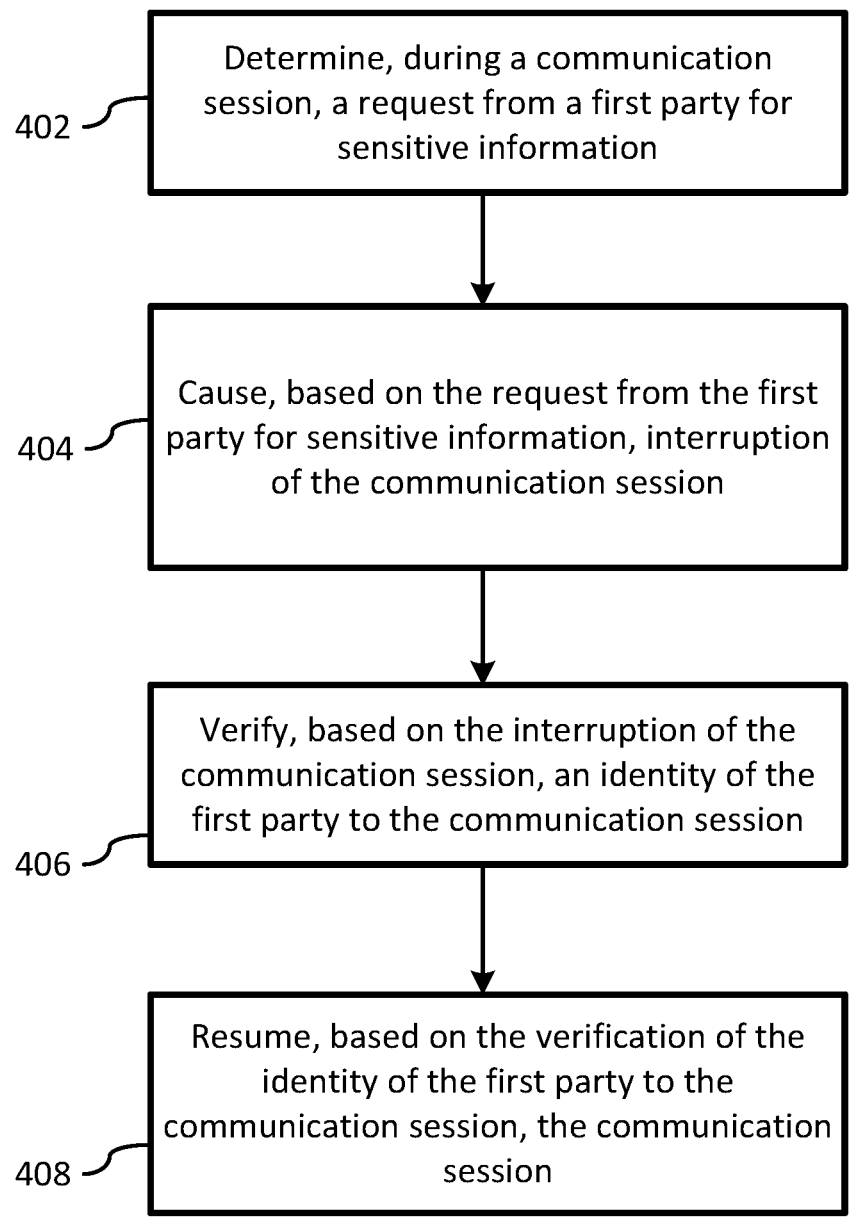
FIG. 4 shows a flow chart of an example method.

FIG. 4 is a flow diagram illustrating an example method. The method 400 may comprise a computer implemented method for providing a service (e.g., a communication service, network service, screening service, filtering service, spam service). A system and/or computing environment, such as the system 100 of FIG. 1 and/or the computing environment of FIG. 7, may be configured to perform the method 400.

At step 402, a request from a first party for sensitive information may be determined during a communication session. The communication session or data associated with the communication session may be received by a computing device, such as a routing device, a breakout gateway control function device, and/or the like. One or more voices associated with the communication session may be converted to text via voice-to-text conversion. One or more keywords may be associated with the request for sensitive information and keyword searching for the one or more keywords may be performed on the converted text of the communication session. Moreover, machine learning may be performed to identify one or more patterns, keywords, etc. associated with requests for sensitive information.

At step 404, an interruption of the communication session may be caused. The interruption may be caused based on the request from the first party for sensitive information. The interruption (e.g., a pause) may prevent a party to the communication session from providing sensitive information without first verifying an identity of the requestor. An indication of a pending verification may be outputting (e.g., via a display) to the first party to the communication session.

At step 406, an identity of the first party to the communication session may be verified. The identity may be verified based on the interruption of the communication session. The verification may be performed based on biometric authorization or audio/video confirmation from a trusted device. A request to a gateway device to authenticate the first party to the call may be sent based on the request from the first party for sensitive information and the verification of the identity of the first party may be based on the authentication of the first party to the communication session. The identity of the first party may be verified based on one or more monitored parameters, e.g., pings from assigned devices on a gateway, television viewing habits for a caller, interaction with a home security system such as unlocking a home security with assigned code, sounds produced in the caller's home environment, etc.

At step 408, the communication session may be resumed based on the verification of the identity of the first party to the communication session. Based on the request from the first party to the communication session for sensitive information and the verification of the identity of the first party, one or more trust rules associating the request from the first party to the communication session for sensitive information with corresponding identification information may be determined. A second party to the communication session may receive an indication of a trust level of the first party to the communication session. Moreover, verification of the identity of the first party may be based on receipt of a signed token and, based on the signed token, a blockchain-based payment may be performed.

Figure 5:
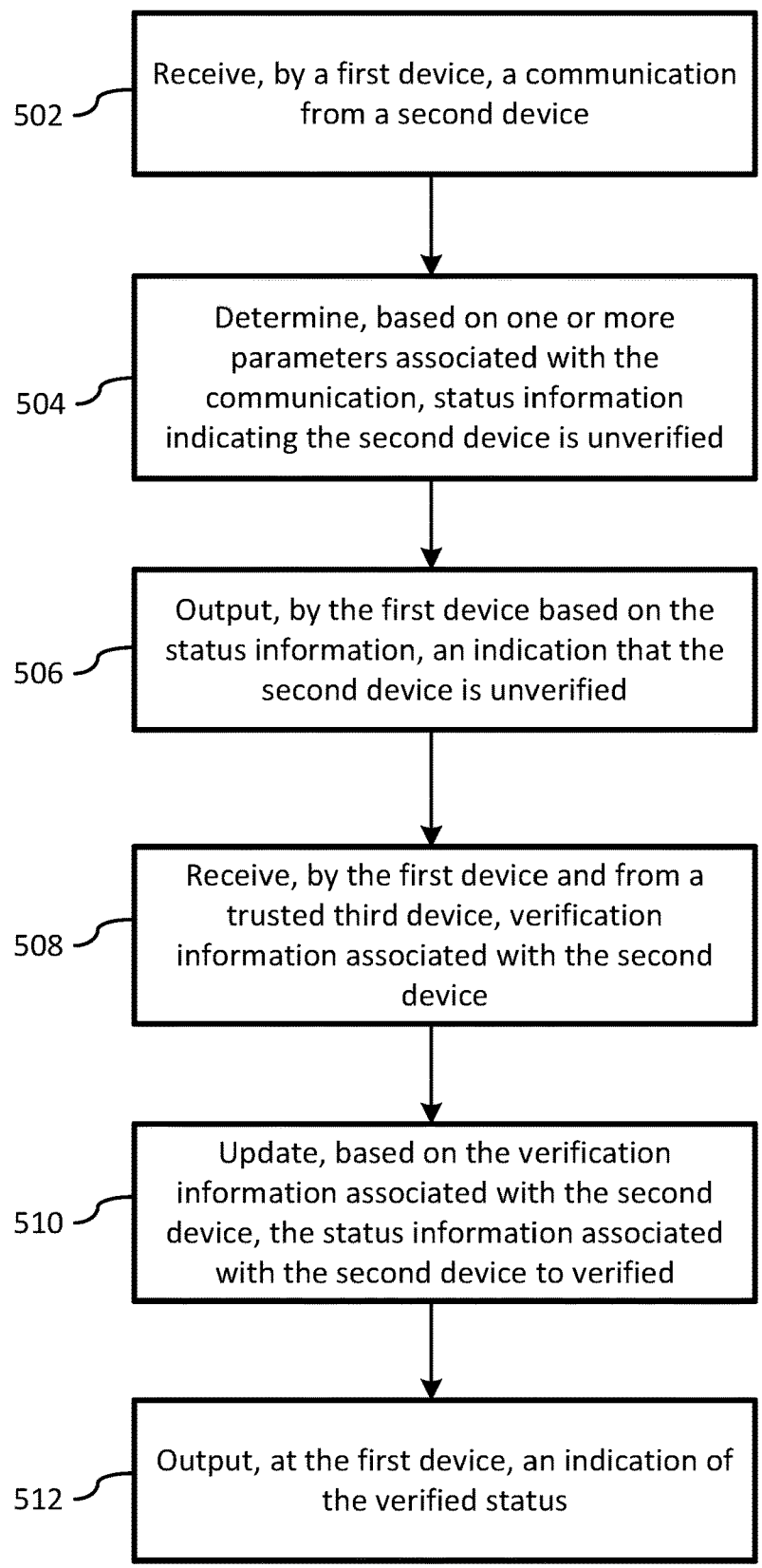
FIG. 5 shows a flow chart of an example method.

FIG. 5 is a flow diagram illustrating an example method. The method 500 may comprise a computer implemented method for providing a service (e.g., a communication service, network service, screening service, filtering service, spam service). A system and/or computing environment, such as the system 100 of FIG. 1 and/or the computing environment of FIG. 7, may be configured to perform the method 500.

At step 502, a first device may receive a communication (e.g., an incoming video call) from a second device. At step 504, it may be determined, based on one or more parameters associated with the communication, status information indicating the second device is unverified. At step 506, an indication that the second device is unverified may be outputted (e.g., via a display) by the first device based on the status information.

At step 508, verification information associated with the second device may be received by the first device from a trusted third device. The second device and the trusted third device may both be associated with a gateway device. The verification information may comprise pings from assigned devices on the gateway, television viewing habits for the caller, unlocked home security with assigned code, sounds produced in the caller's home environment, etc. The verification information may alternatively or further comprise audio or video confirmation of the second device, where the audio or video confirmation of the second device may be captured by the trusted third device.

At step 510, the status information associated with the second device may be updated to verified based on the verification information associated with the second device. At step 512, an indication of the verified status may be outputted (e.g., via a display) at the first device.

Figure 6:
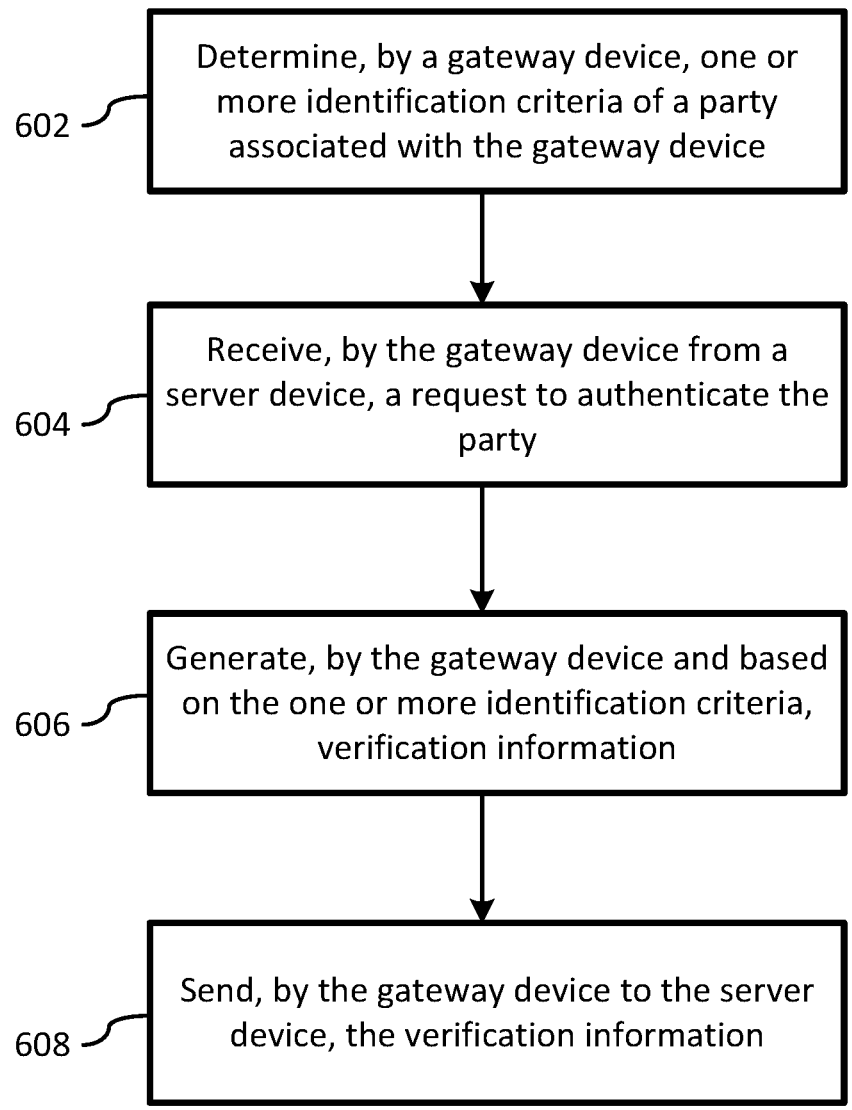
FIG. 6 shows a flow chart of an example method.

FIG. 6 is a flow diagram illustrating an example method. The method 600 may comprise a computer implemented method for providing a service (e.g., a communication service, network service, screening service, filtering service, spam service). A system and/or computing environment, such as the system 100 of FIG. 1 and/or the computing environment of FIG. 7, may be configured to perform the method 600.

At step 602, one or more identification criteria of a party associated with a gateway device may be determined by the gateway device. The identification criteria may comprise communication with one or more assigned devices on the gateway device, television viewing habits, interaction with a home security system, or sounds produced in a physical environment associated with the gateway device.

At step 604, a request to authenticate the party may be received by the gateway from a server device (e.g., a service provider). Based on the request to authenticate the party, at step 606, the gateway device may generate verification information based on the one or more identification criteria. For example, a signed token may be created by the gateway based on the one or more identification criteria. Generating the verification information may be further based on determining the one or more identification criteria exceed a threshold.

In response to the request to authenticate the party, at step 608, the verification information (e.g., a signed token) may be sent by the gateway device to the server device (e.g., a service provider). A signed token may be sent as metadata on an established voice call. For example, the gateway device may send an encrypted token payload (e.g., ayes/no decision) electronically either in the voice call itself or by other electronic means.

Figure 7:
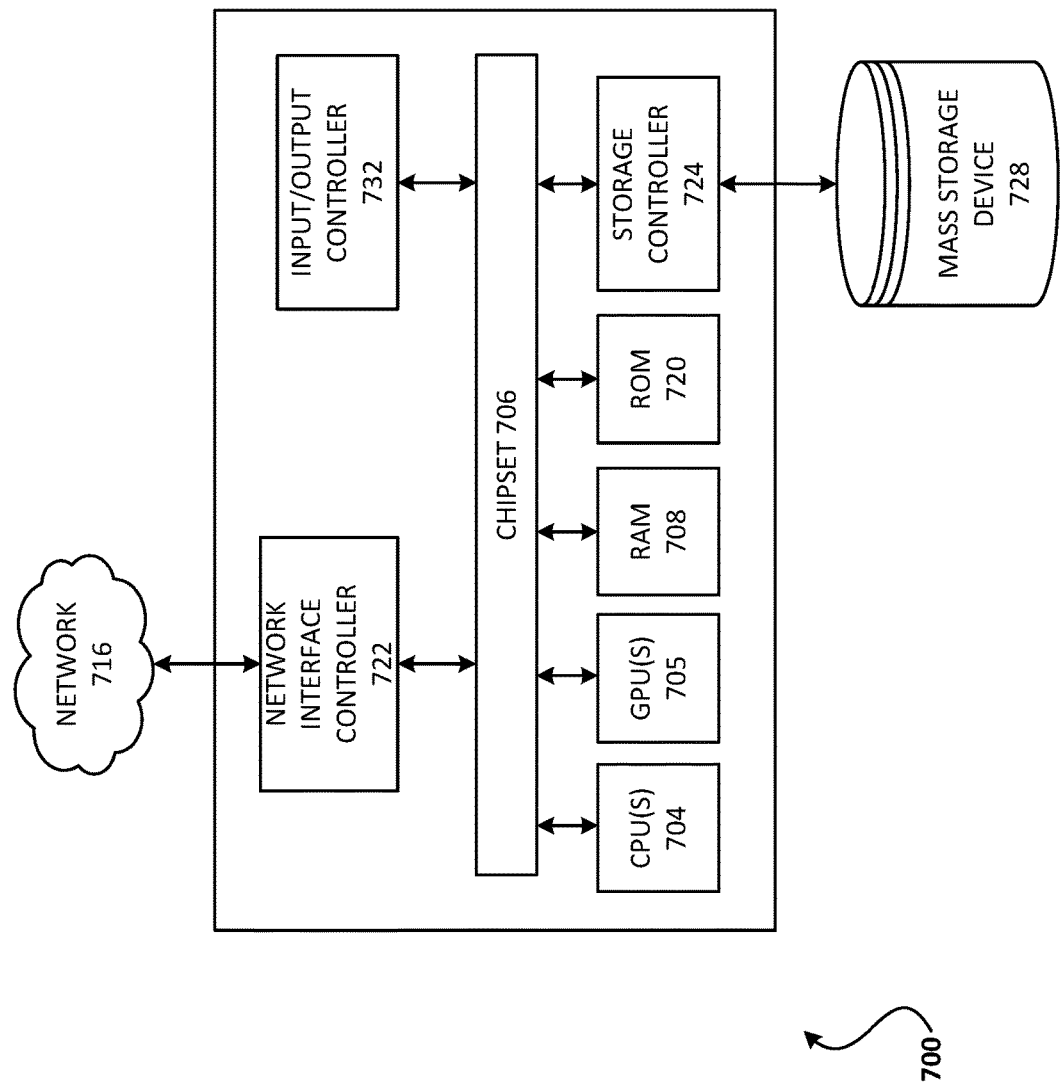
FIG. 7 shows a block diagram of an example computing device.

FIG. 7 depicts a computing device that may be used in various aspects, such as the servers, modules, and/or devices depicted in FIG. 1. With regard to the example architecture of FIG. 1, the security manager 102, verification service 104, network 108, first user device 110, network device 112, and/or second user device 114 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1, 2, 3, 4, 5, and 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A user interface may be provided between the CPU(s) 704 and the remainder of the components and devices on the baseboard. The interface may be used to access a random access memory (RAM) 708 used as the main memory in the computing device 700. The interface may be used to access a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein. The user interface may be provided by a one or more electrical components such as the chipset 706.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a storage device 728 that provides non-volatile storage for the computer. The storage device 728 may store system programs, application programs, other program modules, and data, which have been described in greater detail herein. The storage device 728 may be connected to the computing device 700 through a storage controller 724 connected to the chipset 706. The storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 728 is characterized as primary or secondary storage and the like.

For example, the computing device 700 may store information to the storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the storage device 728 by detecting the physical states or characteristics of one or more particular locations within the physical storage units.

In addition to the storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology.

Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 728 may store other system or application programs and data utilized by the computing device 700.

The storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2, 3, 4, 5, and 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   determining, by a gateway device located at a premises of a user, one or more identification criteria of the user;
   receiving, by the gateway device from a server device located external to the premises, a request to authenticate the user;
   generating, by the gateway device and based on the one or more identification criteria, verification information; and
   sending, by the gateway device to the server device, the verification information.

2. The method of claim 1, wherein generating the verification information is further based on determining the one or more identification criteria exceed a threshold.

3. The method of claim 1, wherein the identification criteria comprises communication with one or more assigned devices in communication with the gateway device, data indicating media consumption at the premises, interaction with a home security system located at the premises, or media captured at the premises.

4. The method of claim 1, wherein the verification information comprises a signed token and the signed token is sent as metadata on an established voice call.

5. The method of claim 1, wherein the one or more identification criteria indicates that the user is located at the premises.

6. The method of claim 1, wherein receiving the request to authenticate the user is based on detection of a request for sensitive information in a communication session associated with the user.

7. The method of claim 1, wherein receiving the request to authenticate the user is based on the server device interrupting a communication session associated with the user.

8. A gateway device comprising:
one or more processors; and
memory storing instructions that, when executed by the one or more processors, cause the gateway device to:
determine, at a premises of a user, one or more identification criteria of the user;
receive, from a server device located external to the premises, a request to authenticate the user;
generate, based on the one or more identification criteria, verification information; and
send, to the server device, the verification information.

9. The gateway device of claim 8, wherein the instructions that, when executed by the one or more processors, cause the device to generate the verification information comprises instructions that, when executed by the one or more processors, cause the device to generate the verification information based on determining the one or more identification criteria exceed a threshold.

10. The gateway device of claim 8, wherein the identification criteria comprises communication with one or more assigned devices in communication with the gateway device, data indicating media consumption at the premises, interaction with a home security system located at the premises, or media captured at the premises.

11. The gateway device of claim 8, wherein the verification information comprises a signed token and the signed token is sent by the gateway device as metadata on an established voice call.

12. The gateway device of claim 8, wherein the one or more identification criteria indicates that the user is located at the premises.

13. The gateway device of claim 8, wherein the instructions that, when executed by the one or more processors, cause the device to receive the request to authenticate the user comprises instructions that, when executed by the one or more processors, cause the device to receive the request to authenticate the user based on detection of a request for sensitive information in a communication session associated with the user.

14. The gateway device of claim 8, wherein the instructions that, when executed by the one or more processors, cause the device to receive the request to authenticate the user comprises instructions that, when executed by the one or more processors, cause the device to receive the request to authenticate the user based on the server device interrupting a communication session associated with the user.

15. A system comprising:
a server device located external to a premises of a user; and
a gateway device located at the premises of the user and configured to:
determine one or more identification criteria of the user;
receive, from the server device, a request to authenticate the user;
generate, based on the one or more identification criteria, verification information; and
send, to the server device, the verification information.

16. The system of claim 15, wherein the gateway device is configured to generate the verification information based on determining the one or more identification criteria exceed a threshold.

17. The system of claim 15, wherein the identification criteria comprises communication with one or more assigned devices in communication with the gateway device, data indicating media consumption at the premises, interaction with a home security system located at the premises, or media captured at the premises.

18. The system of claim 15, wherein the verification information comprises a signed token and the signed token is sent as metadata on an established voice call.

19. The system of claim 15, wherein the one or more identification criteria indicates that the user is located at the premises.

20. The system of claim 15, wherein the server device is configured to send the request to authenticate the user to the gateway device based on detection of a request for sensitive information in a communication session associated with the user.

21. The system of claim 15, wherein the server device is configured to send the request to authenticate the user to the gateway device based on the server device interrupting a communication session associated with the user.

22. A non-transitory computer-readable medium storing computer-executable instructions that, when executed, cause:
determining, by a gateway device located at a premises of a user, one or more identification criteria of the user;
receiving, by the gateway device from a server device located external to the premises, a request to authenticate the user;
generating, by the gateway device and based on the one or more identification criteria, verification information; and
sending, by the gateway device to the server device, the verification information.

23. The non-transitory computer-readable medium of claim 22, wherein generating the verification information is further based on determining the one or more identification criteria exceed a threshold.

24. The non-transitory computer-readable medium of claim 22, wherein the identification criteria comprises communication with one or more assigned devices in communication with the gateway device, data indicating media consumption at the premises, interaction with a home security system located at the premises, or media captured at the premises.

25. The non-transitory computer-readable medium of claim 22, wherein the verification information comprises a signed token and the signed token is sent as metadata on an established voice call.

26. The non-transitory computer-readable medium of claim 22, wherein the one or more identification criteria indicates that the user is located at the premises.

27. The non-transitory computer-readable medium of claim 22, wherein receiving the request to authenticate the user is based on detection of a request for sensitive information in a communication session associated with the user.

28. The non-transitory computer-readable medium of claim 22, wherein receiving the request to authenticate the user is based on the server device interrupting a communication session associated with the user.

* * * * *